United States Patent
Fan et al.

[11] Patent Number: 5,985,175
[45] Date of Patent: Nov. 16, 1999

[54] BORON OXIDE COATED PHOSPHOR AND METHOD OF MAKING SAME

[75] Inventors: Chen-Wen Fan, Sayre; Dale E. Benjamin, Athens, both of Pa.; Franz Kummer, München, Germany; Charles F. Chenot; Richard G. W. Gingerich, both of Towanda, Pa.

[73] Assignee: Osram Sylvania Inc., Danvers, Mass.

[21] Appl. No.: 09/136,782

[22] Filed: Aug. 19, 1998

[51] Int. Cl.$^6$ .............................. C09K 11/02; C23C 4/10; C23C 16/40; B05D 19/02; B05D 15/22

[52] U.S. Cl. ..................... 252/301.4 R; 252/301.4 H; 252/301.4 R; 252/301.4 P; 252/301.5; 252/301.6 R; 252/301.65; 252/301.6 P; 252/304.4 S; 428/403; 428/404; 427/70; 427/213; 427/215; 427/255; 427/255.3

[58] Field of Search ..................... 428/403, 404; 427/70, 213, 215, 255, 255.3; 252/301.4 R, 301.4 H, 301.4 S, 301.4 P, 301.5, 301.6 R, 301.6 S, 301.6 P

[56] References Cited

U.S. PATENT DOCUMENTS

| | | | |
|---|---|---|---|
| 3,897,355 | 7/1975 | Arendt et al. | 252/62.59 |
| 4,585,673 | 4/1986 | Sigai | 427/213 |
| 4,979,830 | 12/1990 | Munn et al. | 366/102 |
| 5,080,928 | 1/1992 | Klinedinst et al. | 427/70 |
| 5,118,529 | 6/1992 | Klinedinst | 427/213 |
| 5,336,822 | 8/1994 | Hucul | 585/444 |

FOREIGN PATENT DOCUMENTS

| | | |
|---|---|---|
| 0 638 625 A1 | 2/1995 | European Pat. Off. . |
| 27 47 509 A1 | 4/1979 | Germany . |

*Primary Examiner*—C. Melissa Koslow
*Attorney, Agent, or Firm*—Robert F. Clark

[57] ABSTRACT

A method for forming a continuous, conformal non-particulate coating of boron oxide on individual phosphor particles is provided. The method involves reacting a boron-containing precursor with an oxidizing gas in a fluidized bed of phosphor particles. The boron oxide coated phosphor exhibits an increased quantum efficiency under ultraviolet (UV) and vacuum ultraviolet (VUV) excitation.

9 Claims, 1 Drawing Sheet

BORON OXIDE COATED PHOSPHOR AND METHOD OF MAKING SAME

TECHNICAL FIELD

This invention relates to coated phosphors and methods for coating phosphors. In particular, this invention relates to boron oxide coated phosphors and methods for applying boron oxide coatings.

BACKGROUND ART

In recent years, it has become increasingly important to reduce the use of mercury in lighting applications because of environmental concerns related to the disposal of the mercury containing lamps. Light sources using mercury-free rare gas discharges could provide a potential solution to the disposal problem if these light sources could be adapted to meet the performance of traditional light sources such as fluorescent lighting. However, conventional fluorescent lamp phosphors which are optimized for use with low pressure mercury discharges exhibit disappointingly low levels of performance when used with rare gas discharges which emit in the vacuum ultraviolet (VUV) region of the electromagnetic spectrum. For example, europium activated yttrium oxide (YOE) phosphor, $Y_2O_3$:Eu, has a quantum efficiency of about 95% when excited with the 254 nm UV radiation from a mercury discharge ($QE_{Hg} \approx 95\%$). The quantum efficiency of the same phosphor drops precipitously as the excitation source enters the vacuum ultraviolet region of the electromagnetic spectrum. Specifically, the quantum efficiency is only about 65% when excited by the 172 nm VUV radiation emitted by a xenon excimer discharge ($QE_{Xe} \approx 65\%$). Thus, it would be an advantage to improve the performance of conventional phosphors under VUV excitation for use with rare gas discharges.

SUMMARY OF THE INVENTION

It is an object of the invention to obviate the disadvantages of the prior art.

It is a further object of the invention to improve the performance of conventional phosphors under VUV excitation.

In accordance with an object of the invention, there is provided a coated phosphor wherein the individual phosphor particles have a continuous, conformal, non-particulate boron oxide coating on each phosphor particle.

In accordance with another object of the invention, there is provided a method for forming a boron oxide coating on individual phosphor particles. The method involves forming a fluidized bed of the phosphor particles, introducing a vaporized boron-containing precursor and an oxidizing gas into the fluidized bed, and reacting the vaporized boron-containing precursor and the oxidizing gas to form a continuous, conformal, non-particulate boron oxide coating on each individual phosphor particle.

DESCRIPTION OF THE PREFERRED EMBODIMENTS

Figure 1:
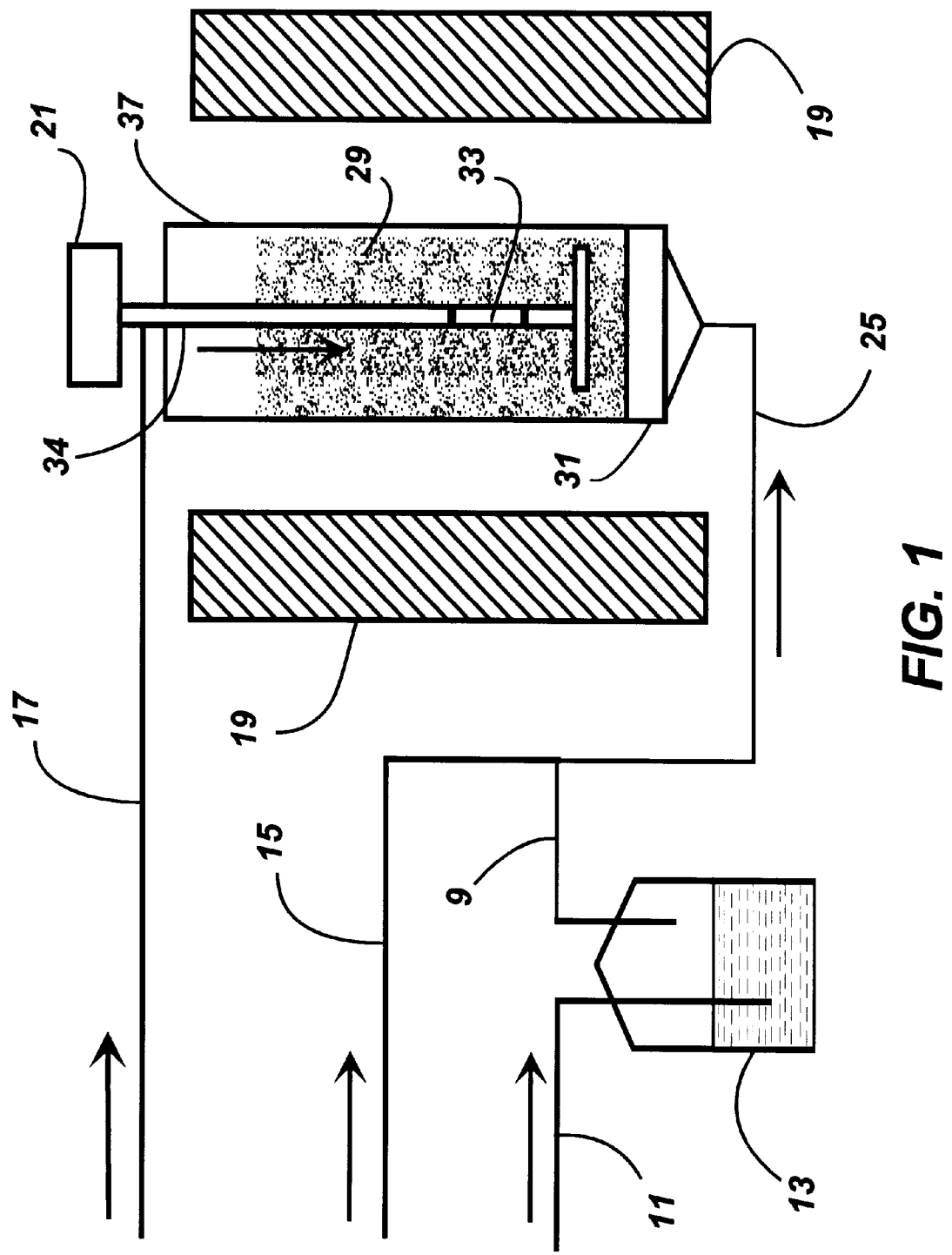
FIG. 1 is a schematic illustration of the fluidized bed coating apparatus.

For a better understanding of the present invention, together with other and further objects, advantages and capabilities thereof, reference is made to the following disclosure and appended claims in conjunction with the above described drawing.

Examples of methods for applying coatings to the surfaces of individual phosphor particles are described in EP 0 638 625 A1 and U.S. Pat. Nos. 4,585,673, 5,118,529, and 5,080,928. Such coatings have a wide range of utility including providing protection from environmental antagonists such as moisture, ionized mercury, and certain ultraviolet wavelengths. We have discovered that the quantum efficiency of a conventional fluorescent lamp phosphor can be improved by coating the individual phosphor particles with a very thin layer of boron oxide. In particular, the boron oxide coating improved the quantum efficiency of a YOE phosphor in both mercury and xenon excimer discharge applications. While not wishing to be bound by theory, it is believed that the coating reduces the recombination of electron-hole pairs at nonradiative sites at the phosphor surface thereby increasing the probability of recombination at activator sites in the phosphor.

The coating is applied by a method similar to the coating method described in U.S. Pat. No. 4,585,673 to Sigai which is incorporated herein by reference. In general, the method involves the chemical vapor deposition of a thin layer of boron oxide on individual phosphor particles while the particles are suspended in a fluidized bed. The phosphor particles in the fluidized bed are exposed to a vaporized boron-containing precursor such as trimethyl borate, $B(OCH_3)_3$, and an oxidizing gas is introduced to react with the vaporized boron-containing precursor. Typically, the fluidized bed is heated to promote the reaction between the oxidizing gas and the boron-containing precursor. The product of this reaction is a continuous, conformal, non-particulate boron oxide coating on each individual phosphor particle. Other possible boron-containing precursors include boron ethoxide, boron isopropoxide, boron n-propoxide, and boron n-butoxide. The oxidizing gas is preferably pure $O_2$, but it is expected that other sources of oxygen such as ozone, nitrous oxide and air will be effective to react with the boron-containing precursor.

In a preferred reaction, oxygen gas and trimethyl borate are reacted at a temperature above about 450° C. to form boron oxide according to the following equation:

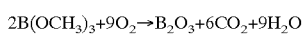

$$2B(OCH_3)_3 + 9O_2 \rightarrow B_2O_3 + 6CO_2 + 9H_2O$$

FIG. 1 shows a schematic illustration of the fluidized bed apparatus used in the method of this invention. Arrows indicate the direction of flow of the various gas streams. A carrier gas 11 is passed through bubbler 13 so that some of the boron-containing precursor in bubbler 13 is vaporized and entrained in the carrier gas to generate reactant gas 9. A fluidizing gas 15 is combined with the reactant gas 9 to form a combined fluidizing/reactant gas 25. The bed of phosphor particles 29 in reactor 37 is fluidized by passing the fluidizing/reactant gas 25 through the porous frit 31 in the bottom of the reactor 37. Preferably, nitrogen is used for the carrier and fluidizing gases. Oxidizing gas 17 is introduced into reactor 37 through a hollow agitator 34 and is injected into the fluidized bed 29 through a porous metal sparger 33 located in agitator 34. The temperature of the reactor 37 is maintained by furnace elements 19 which surround the reactor. Fluidization of the phosphor bed is aided by vibrator motor 21 which is attached to agitator 34. The coating apparatus is described in greater detail in U.S. Pat. No. 4,979,830 to Munn et al. which is incorporated herein by reference.

The following non-limiting examples are presented. Boron oxide coatings were applied to YOE phosphors using the preferred reaction between trimethyl borate and oxygen.

EXAMPLE 1

In this example, 14 kg of a europium-activated yttrium oxide phosphor containing 0.2 wt. % Aluminum Oxide C (AOC) was coated in a 6 inch diameter fluidized bed reactor which was maintained at a 475° C. reaction temperature. The AOC which was added as a fluidization aid is primarily gamma alumina having an average particle size of about 20 nm and a BET surface area of about 84 m²/g. The flow rate of the nitrogen fluidizing gas was 7 l/min. The trimethyl borate bubbler was kept at room temperature and the flow rate of nitrogen carrier gas through the bubbler was controlled at 5 l/min. Pure oxygen gas was passed through the hollow agitator rod into the fluidized bed at a rate of 15 l/min. Several samples were collected from the reactor at different times during the 6 hour coating run. The samples were analyzed for particle size, BET surface area, relative plaque brightness (254 nm UV excitation), coating thickness by Sputtered Neutral Mass Spectrometry (SNMS) and boron concentration by Inductively Coupled Plasma (ICP). The results of the analyses are summarized in Table 1.

TABLE 1

| Sample | Coating Time (hours) | Boron (wt. %) | Coating Thickness (Å) | BET (m²/g) | FSSS (μm) | Rel. Plaque Brightness (%) |
|---|---|---|---|---|---|---|
| Control | Uncoated | 0 | 0 | 0.84 | 2.85 | 100.2 |
| 1-A | 1 | 0.05 | 32 | 0.82 | 3.10 | 101.0 |
| 2-B | 2 | 0.18 | 48 | 0.73 | 3.10 | 102.4 |
| 2-C | 4 | 0.36 | 64 | 0.68 | 3.20 | 102.9 |
| 2-D | 6 | 0.41 | 81 | 0.63 | 3.83 | 102.8 |

The brightness data show that the coated YOE phosphor exhibits an increase in brightness over the uncoated phosphor. Analysis of the particle morphology by Scanning Electron Microscopy (SEM) found that the morphological features of the coated YOE phosphor are nearly identical to the uncoated control indicating that the coating was conformal. The SEM photomicrographs also demonstrate that the boron oxide coating on the phosphor particles is continuous and non-particulate, i.e., does not consist of individual boron oxide particles. The BET measurements support the conformal and non-particulate nature of the boron oxide coating. The surface area of the coated phosphor is not changed appreciably when compared to the surface area of the uncoated phosphor. If the coating were particulate in nature, the surface area of the coated phosphor would be increased significantly. Additionally, because the particle size remained largely unaffected, the UV reflectivity of the material should have also been unaffected. In which case, the increase in brightness also signifies an increase in the quantum efficiency of the phosphor.

EXAMPLE 2

Another coating run similar to Example 1 was performed. However, no AOC was added. The results of the analyses performed on these phosphors are provided in Table 2. As in Example 1, the relative plaque brightness of each coated phosphor is greater than the uncoated control.

TABLE 2

| Sample | Coating Time (hours) | Boron (wt. %) | $B_2O_3$ Coating Thickness (Å) | BET (m²/g) | FSSS (μm) | Rel. Plaque Brightness (%) |
|---|---|---|---|---|---|---|
| Control | Uncoated | 0 | 0 | 0.67 | 3.20 | 96.9 |
| 3-A | 1 | 0.13 | 30 | 0.69 | 3.25 | 99.9 |
| 3-B | 2 | 0.13 | 35 | 0.63 | 3.26 | 99.0 |
| 3-C | 4 | 0.17 | 40 | 0.61 | 3.35 | 102.1 |
| 3-D | 6 | 0.48 | 50 | 0.72 | 3.20 | 99.3 |

Selected $B_2O_3$ coated YOE phosphors from the two sets of examples were compared with uncoated YOE phosphor in Xe excimer T8 tubular lamps. Test lamps were made by coating one half of a T8 bulb with the coated phosphor and the other half with the uncoated reference phosphor. Each T8 bulb was 60 cm in length. After coating, the bulbs were baked at 600° C. and made into lamps. The lumen fluxes of both halves of the lamps were measured simultaneously in integrating cylinders. The simultaneous flux measurement allowed for the determination of the relative efficiencies of the phosphors independent of possible variations in the operating conditions between lamps. Three sets of lamps were measured for each selected coated phosphor. The results are listed in Table 3.

TABLE 3

| Phosphor Sample | $B_2O_3$ Thickness (Å) | Flux differential (%) |
|---|---|---|
| With AOC | | |
| 1-A | 32 | 2.7 ± 4.7 |
| 2-C | 64 | −19.3 ± 2.9 |
| No AOC | | |
| 3-A | 30 | 14.5 ± 0.7 |
| 3-D | 50 | 2.0 ± 4.2 |

No improvement in lamp efficacy was observed for the first set of phosphors made with the AOC fluidizing aid. In fact, for sample 2-C, the measured brightness was about 20% lower than the uncoated reference phosphor. The drop in light output in this case was at least partly caused by problems in lamp processing. The phosphor coating in the test lamp had a brownish tint which indicated that the organic binder was not totally burnt out during the baking of the bulbs. The lack of improvement may also be attributable to the absorption by AOC of the VUV radiation emitted by the Xe excimer discharge thereby reducing the amount available to the phosphor.

For the samples made without the AOC fluidizing aid, an improvement in lamp efficacy was achieved. About 15% higher brightness was observed for sample 3-A over the uncoated reference phosphor. The increase in lumen flux corresponds to an increase in the quantum efficiency of the phosphor since UV reflectance at 172 nm is negligible. No improvement was observed for sample 3-D which had a thicker $B_2O_3$ coating. Since no discoloration of the phosphor was observed in the lamps made with sample 3-D, the lower brightness is not likely associated with lamp processing. More likely, the $B_2O_3$ coating is absorbing some of the VUV radiation. This observation is supported by the excitation reflection spectra of the coated phosphors which show that below about 150 nm the excitation drops with increasing $B_2O_3$ thickness. Thus, thinner coatings are preferred for use with Xe excimer discharges. Preferably, the coating thickness should be less than 50 Å and more preferably the coating thickness should not be more than about 30 Å.

While there has been shown and described what are at the present considered the preferred embodiments of the invention, it will be obvious to those skilled in the art that various changes and modifications may be made therein without departing from the scope of the invention as defined by the appended claims.

We claim:

1. A method for forming a boron oxide coating on individual phosphor particles comprising:

forming a fluidized bed of the phosphor particles;

introducing a vaporized boron-containing precursor and an oxidizing gas into the fluidized bed; and, reacting the vaporized boron-containing precursor and the oxidizing gas to form a continuous, conformal, non-particulate boron oxide coating on each individual phosphor particle, the coating having a thickness of less than about 50 Å.

2. The method of claim 1 wherein the phosphor is a europium activated yttrium oxide phosphor.

3. The method of claim 1 wherein the boron containing precursor is trimethyl borate.

4. The method of claim 3 wherein the oxidizing gas is oxygen.

5. The method of claim 4 wherein the fluidized bed is heated to a temperature above about 450° C.

6. A coated phosphor comprising:

individual phosphor particles having a continuous, conformal, non-particulate boron oxide coating on each phosphor particle, the coating having a thickness of less than about 50 Å.

7. The coated phosphor of claim 6 wherein the phosphor is a europium activated yttrium oxide phosphor.

8. The coated phosphor of claim 7 wherein the boron oxide coating has a thickness of not more than about 30 Å.

9. The coated phosphor of claim 6 wherein boron oxide coating increases the quantum efficiency of the phosphor.

* * * * *